United States Patent [19]

Brown

[11] Patent Number: 5,638,262

[45] Date of Patent: Jun. 10, 1997

[54] METHOD AND APPARATUS FOR PROVIDING ISOLATED POWER SOURCED FROM BLEEDER CURRENT

[75] Inventor: Alan E. Brown, Georgetown, Tex.

[73] Assignee: Dell USA L.P., Austin, Tex.

[21] Appl. No.: 524,862

[22] Filed: Sep. 7, 1995

[51] Int. Cl.$^6$ .......................... H02M 3/335; H02M 3/24; H02M 5/42; H02M 7/44
[52] U.S. Cl. .................................. 363/21; 363/95
[58] Field of Search .................... 363/20, 21, 95, 363/131

[56] References Cited

U.S. PATENT DOCUMENTS

| | | | |
|---|---|---|---|
| 5,175,675 | 12/1992 | Uramoto | 363/19 |
| 5,341,279 | 8/1994 | Yamada | 363/21 |
| 5,424,932 | 6/1995 | Inou et al. | 363/21 |
| 5,499,184 | 3/1996 | Squibb | 363/21 |

*Primary Examiner*—Peter S. Wong
*Assistant Examiner*—Bao Q. Vu
*Attorney, Agent, or Firm*—Stanford & Bennett L.L.P.; Gary R. Stanford

[57] ABSTRACT

An isolated low power converter including a low voltage, self-oscillating power converter, which derives power through bleeder current from the relatively high-voltage, input bulk capacitors. A bleeder circuit taps a relatively low voltage current source from the bulk capacitors to supply an oscillator circuit. The bleeder circuit preferably incorporates current limit resistors typically provided according to safety specifications. The oscillator circuit is preferably implemented using the primary of a transformer. A simple regulator circuit coupled to the secondary of the transformer provides a low voltage SELV power signal for powering detection circuitry. In the preferred embodiment, the bleeder circuit includes a relatively large resistive voltage divider for supplying current to charge a capacitor. The voltage of the capacitor is regulated using a constant voltage device, such as one or more Zener diodes. The oscillator is implemented in a very simple and inexpensive manner, including a switching transistor having a current path coupled to the primary inductor of the transformer, a current limiter coupled between the current path of the transistor and primary ground, a bias circuit coupled to the control terminal of the transistor and a voltage regulating device coupled between the control terminal of the transistor and ground. The transformer preferably includes a tertiary winding coupled between the other end of the voltage divider and the current limiter for facilitating oscillation.

20 Claims, 3 Drawing Sheets

METHOD AND APPARATUS FOR
PROVIDING ISOLATED POWER SOURCED
FROM BLEEDER CURRENT

FIELD OF THE INVENTION

The present invention relates to power supplies, and more particularly to a low power converter circuit for providing power to the secondary-side or isolated detection circuitry for detecting an event, such as activation of a power switch.

DESCRIPTION OF THE RELATED ART

It is becoming more common for manufacturers of personal computers (PC) to replace the traditional mechanical power switch and cable sub-assembly with low power standby circuitry and a simple power switch to implement a soft-start capability. The soft-start capability enables automatic activation and deactivation of the PC based on the occurrence of an event other than simply pressing a power switch, such as activation of a modem or an alarm, etc. The low power standby circuitry enables detection circuitry to detect the events.

A PC incorporating soft-start capability includes a power supply having the AC source always connected and available for providing power. Control circuitry within the primary of the power supply keeps the power supply, and thus the PC, turned off until a signal of some sort is received or asserted by the detection circuitry, indicating the desire to turn the system on. The control circuitry, deriving power from the primary portion, correspondingly begins operating, which turns on the power supply and the PC. The detection circuitry asserting the remote power signal is usually located on the secondary side of the power supply, which must be isolated from the high voltage and current levels of the primary portion to maintain safety specifications and to reduce electromagnetic interference (EMI) problems. However, the detection circuitry located on the secondary side must usually have some sort of power source to enable it to detect any remote events.

There have been two primary methods for providing low power standby sources, otherwise referred to as SELV (secondary extra-low voltage) power sources. The term "SELV" is generally a product safety term that refers to circuitry carrying a maximum voltage level of 42 V peak to peak, which is located on the secondary side of the isolation boundary of the power supply. One method was a relatively simple 50-60 Hertz (Hz) AC transformer that independently connected to the AC source. The transformer secondary provided a low voltage output that was rectified and then regulated to a five volt flea power signal, referred to as +5 VFP. The AC transformer, however, was relatively inefficient and required a significant amount of excitation energy.

A second method was another high-frequency, pulse width modulation (PWM) controlled, off-line, flyback power supply. This method converted power directly from the 300-400 V DC input signal resulting in a relatively inefficient design. Further, an almost duplicate power converter including a PWM control circuit and high voltage metal-oxide semiconductor field-effect transistor (MOSFET) was provided which resulted in a very expensive design.

Although either of the two prior art solutions mentioned above provided the necessary low standby power for achieving soft-start capability, they were relatively expensive to implement in a computer system. Furthermore, experience has shown that the reliability of such circuitry was not as high as is desired. Also, such designs did not have inherent fault mode control and often caused spurious problems.

It is desired to provide a very low cost, standby power converter with increased reliability and fault mode control to achieve soft-start capability for a power supply.

SUMMARY OF THE INVENTION

An isolated low power converter according to the present invention includes a low voltage, self-oscillating power converter, which derives power through bleeder current from the relatively high DC input voltage of a power supply. The DC input voltage is typically developed across bulk capacitors coupled to a bridge rectifier. A bleeder circuit taps a relatively low voltage current source from the bulk capacitors to supply power to an oscillator circuit. The bleeder circuit incorporates the standard current limit resistors coupled to the bulk capacitors to discharge the voltage of the bulk capacitors to allow the power supply to be serviced. The oscillator circuit is preferably implemented using the primary of a transformer, which uses the simplest manufacturing methodology for meeting all product safety requirements as an isolation transformer. A simple regulator circuit coupled to the secondary of the transformer provides a low voltage SELV power signal for powering detection circuitry.

In the preferred embodiment, the bleeder circuit incorporates the relatively large current limit resistors to supply current to charge a filter capacitor. The standard current limit resistors, typically provided to meet product safety requirements to enable servicing but otherwise representing wasted energy, are thus utilized to provide power to a power converter according to the present invention. The voltage of the filter capacitor is regulated using a constant voltage device or voltage limiter, such as one or more Zener diodes.

In one embodiment, Zener diodes are coupled between, and in series with, two relatively large current limit resistors, which are coupled between the DC input voltage and primary ground. A filter capacitor is placed across the Zener diodes for developing the source voltage for the oscillator circuit. The junction between the Zener diodes is coupled to the junction of two series bulk capacitors, resulting in a balanced and very efficient configuration. In another embodiment, a capacitor is placed in series with the current limit resistors, and a Zener diode is placed across the capacitor for regulating its voltage.

The bleeder circuit supplies low operating voltage and current to an oscillator circuit, which is preferably implemented using the primary inductor of a low power transformer. The oscillator includes a switching device for controlling current flow through the primary inductor. The switching device is preferably a relatively low voltage and inexpensive transistor, such as a low voltage MOSFET, a 2N2222 bipolar transistor, etc. The oscillator enables transfer of power to the secondary of the low power transformer, and a relatively simple regulator circuit regulates the low voltage output signal.

In the preferred embodiment, the oscillator includes a switching transistor having a current path coupled to the primary inductor of the transformer. A current limiter is coupled between the current path of the transistor and primary ground. A bias circuit preferably comprising a resistive voltage divider is coupled to the bleeder circuit and has a junction coupled to the control terminal of the transistor. The transformer includes a tertiary winding coupled between the other end of the bias circuit and the junction between the switching transistor and the current limiter for facilitating oscillation. A maximum voltage limiter, such as a Zener diode, is coupled between the control terminal of the transistor and ground.

In operation, when the bleeder circuit provides sufficient voltage, the bias circuit activates the transistor initiating a power phase. The transistor allows increasing current flow through the primary and tertiary inductors for storing energy in the transformer during the power phase. The tertiary inductor turns the transistor fully on, and the increasing current flow causes the voltage of the transistor to increase. However, the voltage limiter clamps the control terminal of the transistor to a maximum voltage level, where the voltage of the current limiter continues to increase thereby turning off the transistor. The voltage of the transformer inductors reverse when the transistor is turned off, thereby turning the transistor fully off and initiating the flyback phase for transferring power to the secondary inductor of the transformer. While the energy in the transformer is being depleted, the voltage across the primary and tertiary inductors decreases, so that the voltage of the control terminal of the transistor increases. When the voltage of the control terminal rises to the turn on voltage of the transistor, it is reactivated to initiate the next cycle of oscillation, where the entire process is repeated.

A power converter according to the present invention is substantially smaller than similar SELV power sources of prior art, thereby reducing overall board area consumed. Because of the bleeder circuit, there are no high voltage stresses, so that any component can be shorted or open-circuited without causing any component failures. In this manner, the present invention is lower cost, and yet also achieves higher reliability with the inclusion of inherent fault-mode control. Thus, the present invention provides a substantial improvement over prior art methods of providing standby power for soft-start capability.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
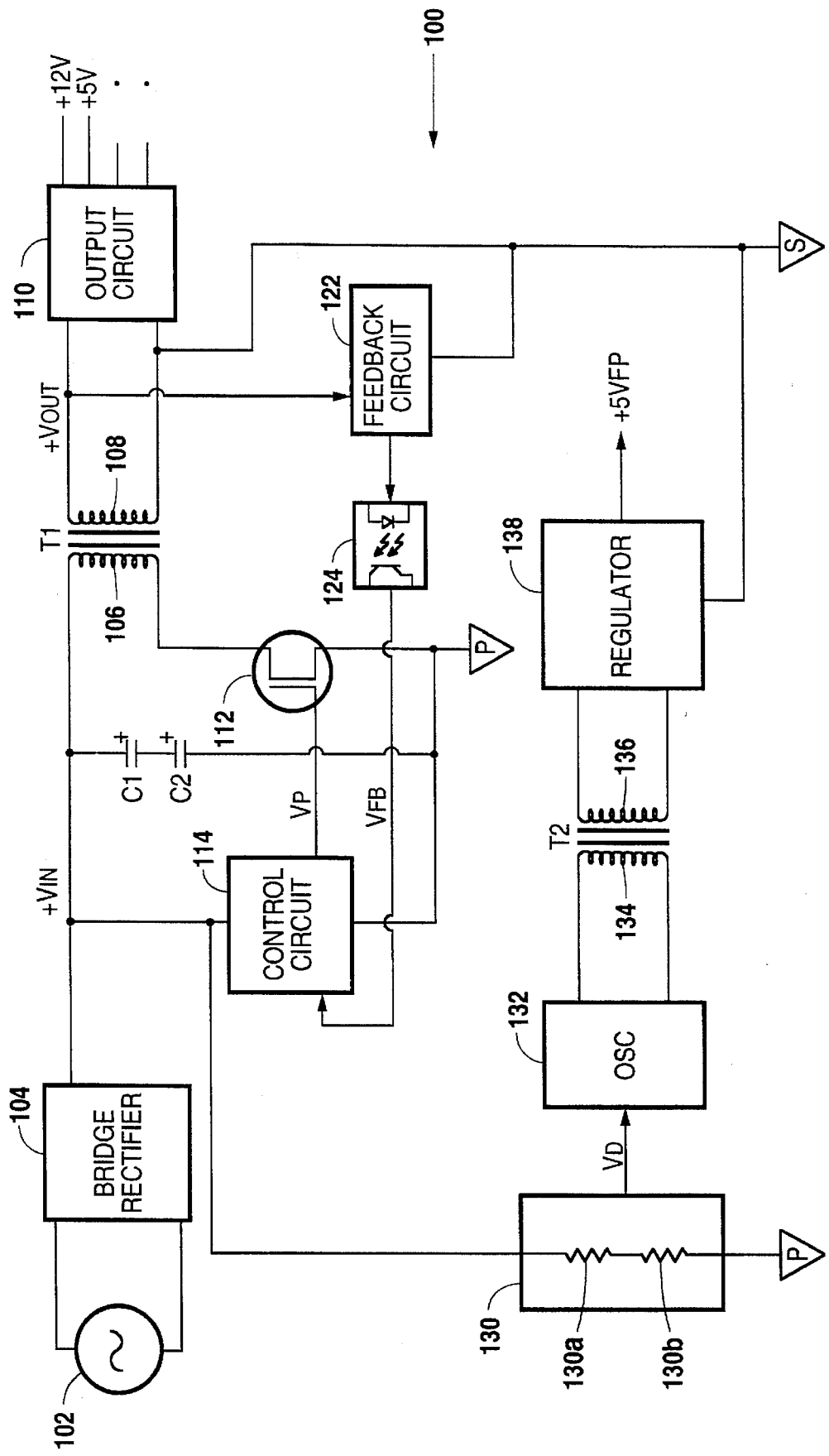
FIG. 1 is a block diagram of a power supply including a low power converter implemented according to the present invention.

Referring now to FIG. 1, a block diagram is shown of a power supply 100 including an isolated power converter 101 according to the present invention. An AC source 102 is provided to the AC input terminals of a bridge rectifier 104, which converts an AC power signal from the AC source 102 to a relatively large and unregulated DC input voltage signal, referred to as $V_{IN}$. The AC source 102 provides an AC power signal having a voltage of 115 V, 230 V, 240 V or any other standard or non-standard voltage depending upon where the power supply 100 is used. The $V_{IN}$ signal is referenced to a primary ground, which is ground for the primary portion of the power supply 100, and is usually between 300–400 VDC. The $V_{IN}$ signal develops across two relatively large bulk capacitors C1 and C2 coupled in series between the $V_{IN}$ signal and primary ground.

The $V_{IN}$ signal is provided to one end of a primary inductor 106 of a relatively high power transformer T1, where the other end of the primary inductor 106 is provided through the current path of a switching transistor 112 to primary ground. The switching transistor 112 is preferably an N-channel metal-oxide semiconductor field-effect transistor (MOSFET) or the like, having its drain-to-source current path coupled between the inductor 106 and primary ground.

The switching transistor 112 includes a control terminal or gate which receives a modulated signal $V_P$ from a control circuit 114. The control circuit 114 is preferably a pulse width modulation (PWM) circuit for activating the switching transistor 112 on repetitive cycles for transferring current through the transformer T1. The control circuit 114 preferably derives power from the $V_{IN}$ signal and is referenced to primary ground. The transformer T1 includes a secondary inductor 108, which develops a $V_{OUT}$ signal to an output circuit 110, which further provides various DC voltage levels required for use by the electronic device. For example, the regulated DC signals may include a +12 V signal, a +5 V signal, etc. The secondary inductor 108 and the output circuit 110 are preferably referenced with respect to a secondary ground.

A feedback circuit 122 preferably monitors the $V_{OUT}$ signal and provides a corresponding signal to an optocoupler 124, which develops a feedback voltage $V_{FB}$ provided to the control circuit 114. This establishes a control feedback loop so that the control circuit 114 continuously adjusts the $V_P$ signal to control the $V_{OUT}$ signal to the proper voltage level. The transformer T1 and the optocoupler 124 provide the necessary isolation between the primary and secondary portions of the power supply 100 to meet safety specification standards.

The isolated power converter 101 includes a bleeder circuit 130 coupled between the $V_{IN}$ signal and ground for developing a relatively low DC source voltage signal referred to as $V_D$. In the preferred embodiment, the bleeder circuit 130 draws a relatively low amount of current and the $V_D$ signal is a relatively low voltage compared to the $V_{IN}$ signal. In particular, the $V_{IN}$ signal is typically in the range of 300–400 VDC, whereas the $V_D$ signal is preferably 42 VDC or less. The $V_D$ signal is provided to an oscillator 132, which is coupled to a primary inductor 134 of a relatively low power transformer T2. The transformer T2 includes a secondary inductor 136, which is coupled to the input of a secondary extra low voltage (SELV) regulator 138 referenced to secondary ground. The regulator 138 provides a five volt flea (or low) voltage signal, referred to as +5 VFP, at its output. In the preferred embodiment, the regulator 138 is able to deliver about 50–100 milli-Watts (mW) of power.

The bleeder circuit 130 preferably draws a relatively low amount of current and develops a relatively low voltage, so that it consumes a very small amount of power compared to the power supply 100 itself when fully operating. The bleeder circuit 130 preferably includes two relatively large current limit resistors 130a, 130b coupled in series, along with other components described below for regulating the $V_D$ signal. Such current limiter resistors are a standard part of a typical power supply for discharging the bulk capacitors C1, C2 when the power supply 100 is turned off and unplugged. In fact, the junction between the resistors 130a, 130b is usually coupled to the junction between the capacitors C1, C2. This achieves product safety requirements by allowing the power supply to be serviced without the risk of electrical shock. During operation, however, the resistors 130a, 130b typically represented wasted energy in prior art designs. In a power converter according to the present invention, however, these resistors are used to develop a low voltage supply for the oscillator 132.

The oscillator 132 is preferably a self-oscillating circuit, where the primary inductor 134 of the transformer T2 forms part of the oscillator circuit. This enables power transfer across the transformer T2 to the secondary inductor 136 and to the regulator 138 while maintaining the desired primary to secondary isolation.

Prior art designs of SELV power sources were primarily based on two methods. In a first method of prior art, a 50–60 Hertz (Hz) AC transformer was coupled directly to the AC source 102 for providing power to an SELV-side regulation circuit. Such a transformer was relatively expensive and very lossy, resulting in a relatively inefficient design. In fact, it often required at least one Watt (1 W) or more of excitation power just to excite the core of such an AC lossy transformer. In a second method of prior art, another PWM circuit and switching device, such as a high voltage MOSFET or the like, along with another relatively high voltage transformer, was necessary to transfer power to SELV-side circuitry to develop the +5 VFP signal. This second method directly converted 300–400 VDC to a five volt low power output, which provided about 50–100 mW of power. This resulted in significant inefficiency. The MOSFET had to have a rating of about 600 V. The second method, therefore, also resulted in an inefficient and relatively expensive design.

Figure 2:
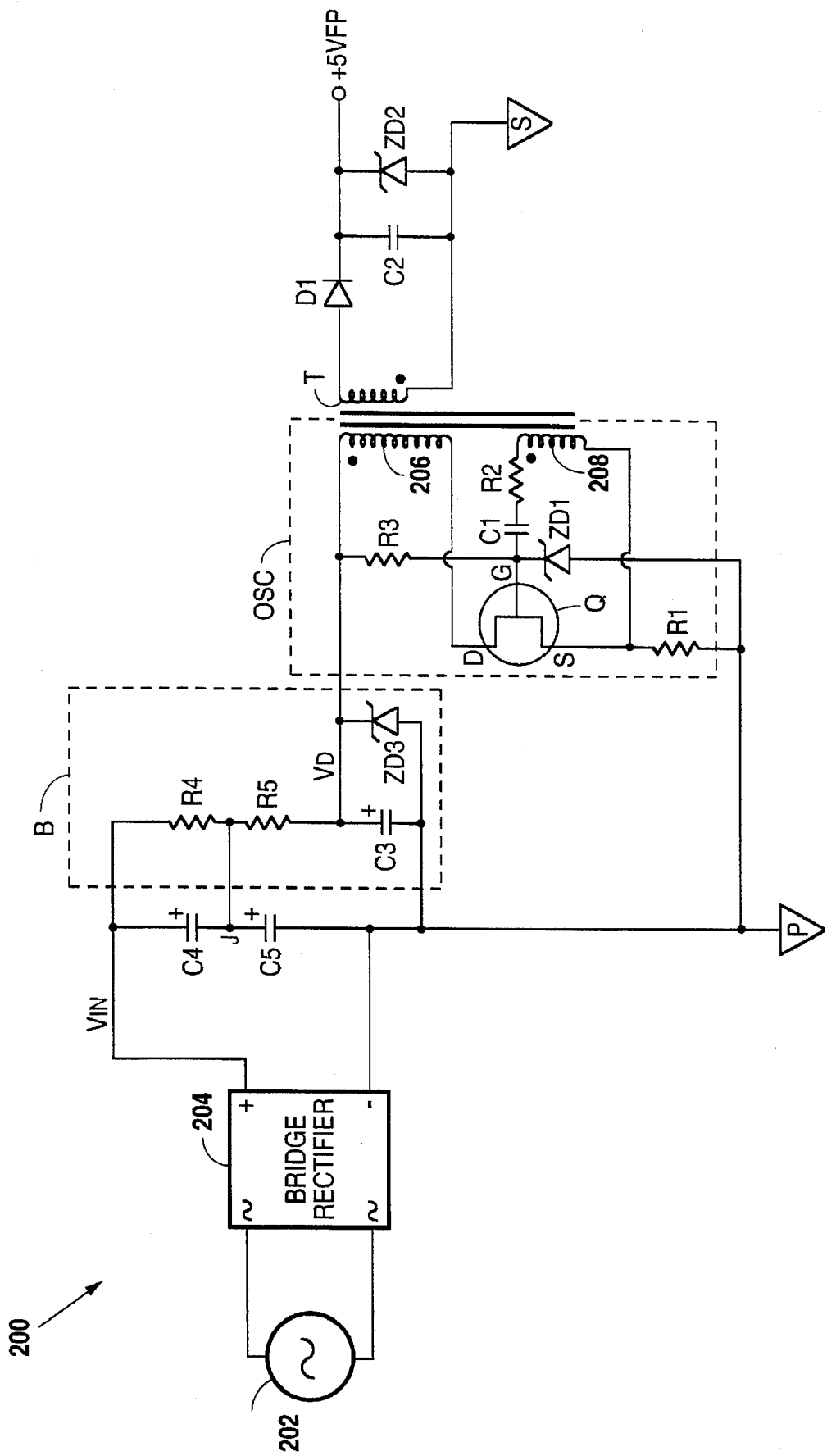
FIG. 2 is a schematic diagram of a power converter according to the present invention.

Referring now to FIG. 2, a schematic diagram is shown of an isolated power converter 200 of a power supply implemented according to the present invention. The remaining portion of the power supply is not shown for purposes of clarity. An AC source 202 provides an AC power signal to the inputs of a bridge rectifier 204, which develops a relatively unregulated and large DC input voltage, referred to as $V_{IN}$, across series bulk capacitors C4 and C5. The voltage of the AC source 202 is any desired or standard or nonstandard Vrms value, such as 115, 230, 240, etc. The capacitors C4 and C5 are connected in series between the $V_{IN}$ signal and a primary ground, having a junction referred to as J.

A current limit resistor R4 receives the $V_{IN}$ signal at one end and has its other end connected to the J node and to one end of another current limit resistor R5. The other end of the resistor R5 is provided to one end of a capacitor C3, to the cathode of a Zener diode ZD3, to one end of a resistor R3, and to the start end of a primary inductor 206 of a relatively low power transformer T. The other end of the capacitor C3 and the anode of the Zener diode ZD3 are connected to the primary ground. The resistors R4 and R5, the capacitor C3 and the Zener diode ZD3 form a bleeder circuit B. The voltage across the capacitor C3 is referred to as $V_D$. Again, it is noted that bleeder resistors, such as the resistors R4 and R5, were standard in prior art designs to achieve product safety requirements. These resistors represented wasted energy, however, during operation and when the power supply is turned off. A power converter according to the present invention, however, utilizes some of this energy to achieve the soft-start capability, as described further below.

The other end of the resistor R3 is provided to the gate of an N-channel, enhancement MOSFET Q, to one side of a capacitor C1 and to the cathode of another Zener diode ZD1. The finish end of the primary inductor 206 is connected to the drain of the MOSFET Q. The other end of the capacitor C1 is connected to one end of a resistor R2, having its other end provided to the start end of a tertiary inductor 208 of the transformer T. The tertiary inductor 208 is preferably wound in phase with the primary inductor 206. The finish end of the tertiary inductor 208 is connected to one end of a resistor R1 and to the source of the MOSFET Q. The other end of the resistor R1 and the anode of the Zener diode ZD1 are connected to primary ground. The resistors R3, R2 and R1, the primary and tertiary inductors 206 and 208, the capacitor C1, the MOSFET Q and the Zener diode ZD1 form an oscillator circuit OSC.

In the preferred embodiment, the capacitor C3 is approximately 10 microfarads (µF), the Zener diode ZD3 has a voltage of approximately 30 V, the resistor R3 is approximately 200KΩ, the resistor R2 is approximately 1KΩ and the resistor R1 is approximately 150Ω. The MOSFET Q is preferably an inexpensive and relatively low voltage MOSFET, such as the 2N7000 or the like. The Zener diode ZD1 is preferably the 1N714A, having a voltage of approximately 10 V and the capacitor C1 is preferably a 0.01 µF capacitor. The capacitor C1 serves as a charge pump for turning on the MOSFET Q. The voltage of the Zener diode ZD1 limits the maximum voltage of the gate of the MOSFET Q to approximately 10 V. The resistors R4 and R5 are typically in the range of 50–100KΩ or more. Compared to prior art designs, these resistors R4, R5 may be slightly reduced depending upon the current requirements of the oscillator OSC and the output regulation circuit.

The transformer T has a secondary inductor 210, having its start end connected to a secondary ground and its finish end connected to the anode of a diode D1, which is preferably the 1N4934. The secondary inductor 210 is preferably wound out of phase relative to the primary and tertiary inductors 206, 208 to implement a flyback converter. It is noted, however, that the present invention may be implemented as a forward converter as well, where the present invention is not limited to any particular converter topology. The cathode of the diode D1 provides a flea power standby power signal, referred to as +5 VFP, for providing power to detection circuitry (not shown). This +5 VFP power signal is preferably capable of delivering approximately 50–100 mW of power. The cathode of the diode D1 is also connected to one end of a capacitor C2 and to the cathode of another Zener diode ZD2. The other end of the capacitor C2 and the anode of the Zener diode ZD2 are connected to secondary ground. In the preferred embodiment, the capacitor C2 is 10 µF and the Zener diode ZD2 is the 1N751A, having a voltage of approximately 5.1 V.

Operation of the power converter 200 is now described. The AC source 202 provides an AC power signal to the bridge rectifier 204, which provides the DC input voltage $V_{IN}$ across the bulk capacitor C4 and C5. The $V_{IN}$ signal is then provided to the primary portions of the main power supply (not shown), which is preferably turned on or off by receiving a remote signal (not shown). A bleeder current flows through the resistors R4 and R5 for charging the capacitor C3 and thus the $V_D$ signal to approximately 30 V as limited by the Zener diode ZD3. The $V_D$ signal from the bleeder circuit B is provided across the resistors R3 and R2 to charge the capacitor C1 of the oscillator circuit OSC. The voltage at the gate of the MOSFET Q rises until the MOSFET Q is turned on, causing current to ramp up in linear fashion through the primary inductor 206, through the drain-to-source current path of the MOSFET Q and through the resistor R1. The tertiary inductor 208 also sources linear ramping current from its start end to feed the MOSFET Q to turn it fully on. The voltages of the source and gate of the MOSFET Q increase primarily because of increasing current flow from the inductors 206, 208 into the resistor R1. The voltage of the gate, however, is limited to the maximum voltage of the Zener diode ZD1 to approximately 10 V. When this voltage is reached, the source voltage continues to increase, which eventually turns off the MOSFET Q. When the MOSFET Q turns off, current stops flowing through the primary and tertiary inductors 206, 208. This terminates the power phase and initiates the flyback phase of the cycle.

While current is flowing through the primary inductor 206, the transformer T stores energy since the diode D1 prevents current flow through the secondary inductor 210. When the MOSFET Q is turned off initiating the flyback phase, the secondary inductor 210 reverses voltage to forward bias the diode D1, which allows current flow to charge the capacitor C2 and to develop the +5 VFP signal. The secondary inductor 210 regulates the voltage to approximately 5 V, and the Zener diode ZD2 assures that the voltage does not rise above 5.1 V.

When the MOSFET Q is turned off, the voltage of the tertiary inductor 208 reverses thereby taming the MOSFET Q fully off. The negative voltage across the tertiary inductor 208 (referenced with respect to its start end) causes the voltage of the source of the MOSFET Q to be positive relative to its gate. This voltage differential charges the capacitor C1 to a significant voltage level to eventually turn the MOSFET Q back on. The energy stored in the transformer T is transferred to the secondary circuit as described above. Once most of the energy is transferred, the voltage at the gate of the MOSFET Q provided by the capacitor C1 turns on the MOSFET Q, initiating the power phase of the next cycle. The entire procedure is repeated in cyclic manner. In this manner, the power converter 200 according to the present invention is a self-oscillating circuit for developing a low-power standby voltage signal at its output, typically referred to as +5 VFP. This voltage is used to provide power to secondary-side detection circuitry for sensing activation events, such as a modem, an alarm, a power switch, etc.

The power converter 200 of FIG. 2 greatly reduces the size and cost of SELV power circuitry as compared to prior art designs. The current drain through the resistors R4 and R5 is relatively small, so that any shorts in the bleeder circuit B and/or the oscillator circuit OSC is relatively inconsequential. In fact, shorting the capacitor C3 causes little or no harm because the resistors R4 and R5 limit current to a relatively low level. Prior art designs could cause dangerous or even catastrophic results in the event of a short or other fault since they usually derive power directly from the AC source 202 or from the high voltage $V_{IN}$ signal. Thus, the power converter 200 includes inherent fault mode control. Further, the use of the capacitor C3 and the Zener diode ZD3 substantially reduces operating voltage of the converter 200, thereby eliminating high voltage stresses. Accidental electrical opens or shorts therefore cause no component failures.

The power converter 200, however, has a few deficiencies. The capacitor C3 causes an imbalance range and current variation through the resistors R4 and R5 primarily with variations of the voltage of the AC input power signal and also with variations of the load. Also, the oscillator circuit OSC, though relatively simple and inexpensive, includes a relatively expensive MOSFET Q and further includes the capacitor C1. The capacitor C1 could be eliminated by modifying the resistive ratio of the resistors R3 and R2 to increase the gate voltage. However, the capacitor C1 serves as a charge pump and is the preferred method to assure activation of the MOSFET Q during each cycle.

Figure 3:
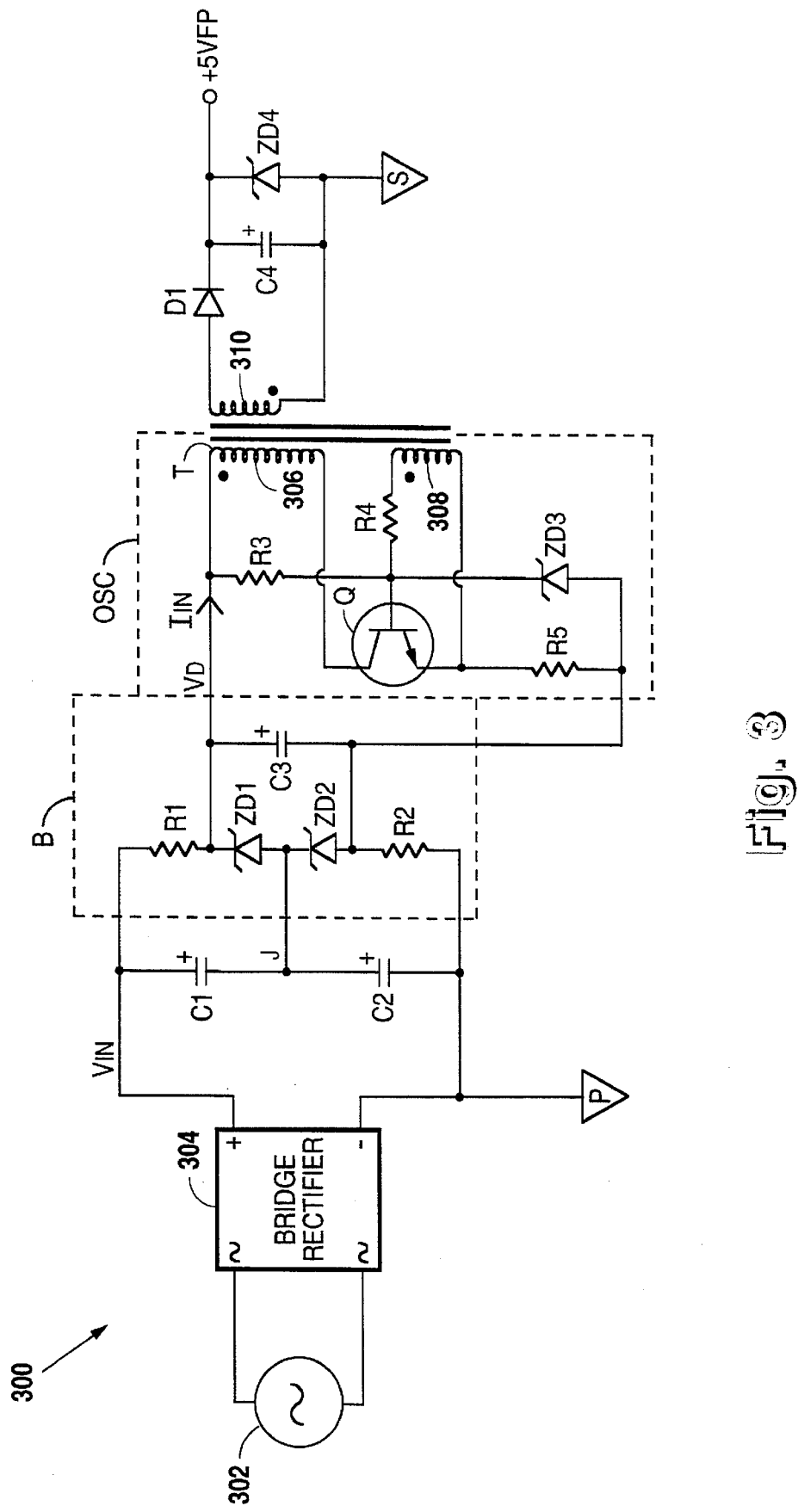
FIG. 3 is a schematic diagram of a power converter according to an alternative embodiment of the present invention.

Referring now to FIG. 3, a schematic diagram is shown of a power converter 300 of a power supply according to an alternative embodiment of the present invention. Again, the remaining portions of the power supply are not shown. An AC source 302 is connected to a bridge rectifier 304 for developing a relatively large unregulated DC input voltage, referred to as $V_{IN}$, across two series bulk capacitors, C1 and C2. The $V_{IN}$ signal is preferably 325 VDC, or between 300–400 VDC. The capacitors C1 and C2 are coupled in series between the $V_{IN}$ signal and a primary ground, having a junction J. Operation of the AC source 302, the bridge rectifier 304 and the capacitors C1 and C2 are very similar to the operation of the AC source 202, the bridge rectifier 204 and the capacitors C4, C5 of FIG. 2.

The $V_{IN}$ signal is provided to one end of a current limit resistor R1, having its other end connected to the cathode of a Zener diode ZD1, to one end of a capacitor C3 and to the start end of a primary inductor 306 of a transformer T. The anode of the Zener diode ZD1 is connected to the junction J between the capacitors C1 and C2, which is connected to the cathode of another Zener diode ZD2. The anode of the Zener diode ZD2 is connected to the other end of the capacitor C3 and to one end of another current limit resistor R2, having its other end connected to primary ground. The voltage across the capacitor C3 is referred to as $V_D$.

The resistors R1 and R2, the Zener diodes ZD1 and ZD2 and the capacitor C3 form a bleeder circuit B. In the preferred embodiment, the resistors R1 and R2 are both 43KΩ, one watt resistors, and the Zener diodes ZD1 and ZD2 are both 20 V diodes. In this manner, approximately 40–41 VDC develops across the capacitor C3 to develop the $V_D$ signal. It is noted that since the $V_{IN}$ signal is approximately 300–400 VDC, the Zener diodes ZD1 and ZD2 provide a substantially reduced voltage of the $V_D$ signal as compared to the $V_{IN}$ signal. The resistors R1 and R2 substantially limit current in the event of any electrical shorts of the Zener diodes ZD1, ZD2 or the capacitor C3. Again, the resistors R1 and R2 are provided in typical power supply designs to meet product safety requirements. Their values may be slightly reduced to achieve the desired bleeder current necessary for an oscillator circuit OSC, described below. Although it may appear that such reduction might decrease efficiency by increasing the bleeder current, the overall efficiency of the power converter 300 is higher than SELV power sources of prior art.

The other end of the resistor R3 is connected to the base of an NPN bipolar transistor Q, to one end of a resistor R4 and to the cathode of another Zener diode ZD3. The collector of the transistor Q is connected to the finish end of the primary inductor 306 and its emitter is connected to one end of a resistor R5. The other end of the resistor R5 and the anode of the Zener diode ZD3 are connected to primary ground. The other end of the resistor R4 is connected to the start end of a tertiary inductor 308 of the transformer T, having its finish end provided to the emitter of the transistor Q. The tertiary inductor 308 is wound in phase with the primary inductor 306.

The resistors R3, R4 and R5, the primary and tertiary inductors 306 and 308, the transistor Q and the Zener diode ZD3 form the oscillator circuit OSC. In the preferred embodiment, the resistor R3 is approximately 300KΩ, the resistor R4 is approximately 5.6 KΩ and the resistor R5 is approximately 100 Ω. The primary inductor 306 is preferably 75n turns and the primary inductor 308 is preferably 8n turns, where n is an integer and is preferably equal to one (1). The Zener diode ZD3 is preferably the 1N748A, having a voltage of approximately 3.9 V.

A secondary inductor 310 of the transformer T has its start end connected to secondary ground and its finish end connected to the anode of a diode D1. The cathode of the diode D1 is provided to one end of a capacitor C4, to the cathode of another Zener diode ZD4, which provides a low power standby signal referred to as +5 VFP. The other end of the capacitor C4 and the anode of the Zener diode ZD4 is connected to secondary ground. In the preferred embodiment, the capacitor C4 is 10 µF and the Zener diode ZD4 is preferably an 1N751A, having a voltage of 5.1 V. Also, the number of turns of the secondary inductor 310 is preferably 25n turns.

Operation of the power converter 300 is now described, which is similar to the operation of the power converter 200 in FIG. 2. A voltage of approximately 40–41 V develops across the capacitor C3 and is provided across the resistors R3 and R4. The ratio of the resistors R3 and R4 establish a voltage of approximately 0.7–0.75 volts, assuming little voltage drop across the tertiary inductor 308. The $V_{BE}$ voltage of the transistor Q thus rises to turn on the transistor Q to initiate a power phase causing linear ramping current flow through the primary inductor 306. The tertiary inductor 308 also conducts causing linear ramping current to flow out of its start end into the base of the transistor Q and into the Zener diode ZD3, turning the transistor Q fully on. Also, the linearly ramping current through the inductors 306 and 308 increases the voltage of the resistor R5. In this manner, the voltage at the base and emitter of the transistor Q is increased with the ramping up current of the inductors 306, 308, until the voltage of the base of the transistor Q is clamped by the Zener diode ZD3.

The voltage of the emitter of the transistor Q continues to increase reducing the $V_{BE}$ voltage, which tends to turn off the transistor Q. Eventually the transistor Q turns off, stopping current flow through the inductors 306 and 308 and initiating the flyback phase of the cycle. Energy stored in the transformer T due to the current flow through the inductors 306 and 308 is released into the secondary inductor 310. The voltage reversal of the primary and tertiary inductors 306, 308 turns the transistor Q fully off during the flyback phase. The +5 VFP signal is developed across the capacitor C4.

During the flyback phase while energy stored in the transformer T is transferred, the voltage of the primary and tertiary inductors 306, 308 falls back to zero. The voltage at the base of the transistor Q is correspondingly increased until the transistor Q is once again turned on to initiate the next power phase. The oscillator circuit OSC continues to oscillate to transfer power to the secondary.

In the preferred embodiment, a load of approximately 470Ω on the +5 VFP signal is considered a maximum load, where the voltage $V_D$ across the capacitor C3 is 40–41 VDC, the input current, referred to as $I_{IN}$, is 2.58 milli-amperes (mA) and the +5 VFP signal falls to approximately 4.7 VDC. With no load applied, the input current $I_{IN}$ is approximately 2.63 mA and the +5 VFP signal is approximately 5.15 VDC. Thus, the input current $I_{IN}$ is relatively stable with variations of the load, as evidenced by only about 5 mA variation between no load and full load. The +5 VFP signal preferably delivers between 10–20 mA for a power range of approximately 50–100 mW.

The power converter 300 has several advantages and improvements over the power converter 200. The bleeder circuit B is balanced since the Zener diodes ZD1, ZD2 are balanced between the current limit resistors R1 and R2, which are further balanced relative to the bulk capacitors C1 and C2. Such balancing reduces stress voltages applied to the bulk capacitors C1 and C2, which might otherwise damage these resistors. Also, the transistor Q replaces the MOSFET, which is typically more expensive. In fact, a very inexpensive and common 2N2222 type transistor may be used, although any suitable and comparable transistor will suffice.

It is now appreciated that a power converter according to the present invention offers several improvements over SELV power sources of prior art. A bleeder circuit taps a relatively low power current source for providing energy to an oscillator circuit. The bleeder circuit preferably incorporates the standard current limit resistors provided on standard power supplies for meeting safety requirements. The oscillator circuit includes low voltage, low power and inexpensive components as compared to prior designs. The result of such low voltage and inexpensive components results in a more efficient and fault-tolerant design. There are no high voltage stresses so that any component can be electrically shorted or opened without resulting in component failure. Low voltage enables a substantial increase in efficiency in low power conversion, since substantially less power is used or lost. The resulting design is significantly less expensive and consumes less board space, resulting in a much more economical power supply.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A power converter sourced from bleeder current of a power supply, the power supply including a primary portion for converting an AC power signal to a DC input voltage referenced to a primary ground, said power converter comprising:

a bleeder circuit for receiving said DC input voltage for providing a relatively low level DC supply voltage;

an oscillator circuit including a low-power transformer having a primary inductor and a secondary inductor, wherein said primary inductor is coupled to said bleeder circuit to receive said DC supply voltage, and wherein said oscillator operates to transfer power to said secondary inductor; and a regulator circuit coupled to said secondary inductor of said transformer for regulating a secondary low voltage signal.

2. The power converter of claim 1, wherein said bleeder circuit comprises:

first and second current limit resistors for coupling in series between the DC input voltage and the primary ground;

first and second Zener diodes for coupling in series between said first and second current limit resistors; and a capacitor coupled across said first and second Zener diodes for providing said DC supply voltage.

3. The power converter of claim 2, wherein the primary portion includes first and second bulk capacitors coupled in series between the DC input voltage and ground, wherein said first current limit resistor and said first Zener diode are coupled in series across the first bulk capacitor, and wherein said second current limit resistor and said second Zener diode are coupled in series across the second bulk capacitor.

4. The power converter of claim 1, wherein said DC supply voltage is approximately 42 volts or less.

5. The power converter of claim 1, wherein the primary portion includes first and second bulk capacitors coupled in series between the DC input voltage and primary ground, wherein said bleeder circuit comprises:

first and second current limit resistors for coupling across the first and second bulk capacitors, respectively;

a capacitor for coupling in series with said second resistor across the second bulk capacitor; and a Zener diode for coupling in parallel with said capacitor.

6. The power converter of claim 1, wherein said oscillator circuit comprises:

a switching device having a control terminal and having a current path coupled to control current through said primary inductor of said transformer;

a current limiter coupled between the current path of said switching device and primary ground;

a bias circuit having two ends with one end coupled to said DC source voltage and having a junction coupled to said control terminal of said switching device;

said transformer including a tertiary inductor coupled between the other end of said bias circuit and said current limiter; and a voltage limiter coupled between said control terminal of said switching device and primary ground.

7. The power converter of claim 6, wherein said switching device is a bipolar transistor.

8. The power converter of claim 6, wherein said bias circuit comprises a resistive voltage divider for dividing the voltage of said DC source voltage to a voltage sufficient to turn on said switching device to initiate a power phase of each cycle of said oscillator circuit.

9. The power converter of claim 6, wherein said current limiter comprises a resistor.

10. The power converter of claim 6, wherein said voltage limiter comprises a Zener diode.

11. The power converter of claim 6, wherein said bias circuit comprises:

a first resistor coupled between said DC source voltage and said control terminal of said switching device;

a capacitor coupled to said control terminal of said switching device; and a second resistor coupled between said capacitor and said tertiary inductor.

12. The power converter of claim 6, wherein said switching device comprises a field-effect transistor.

13. The power converter of claim 1, wherein said power converter operates in flyback mode.

14. A power supply, comprising:

a bridge rectifier for converting an AC power signal to a relatively large DC input signal referenced to a primary ground;

at least one bulk capacitor coupled between said DC input signal and primary ground for filtering said DC input signal;

a bleeder circuit coupled to said at least one bulk capacitor and receiving said DC input signal for providing a relatively low DC supply voltage referenced to primary ground;

a low power transformer having a primary and a secondary;

an oscillator circuit coupled to said bleeder circuit and said primary of said transformer for transferring power to said secondary; and a regulator circuit coupled to said secondary of said transformer for regulating a secondary low voltage signal.

15. The power supply of claim 14, wherein:

said at least one bulk capacitor comprises a first and a second bulk capacitor coupled in series having a junction;

said bleeder circuit comprising:

first and second current limit resistors coupled in series between said DC input signal and primary ground; and first and second voltage limit devices coupled in series between said first and second current limit resistors, said first and second voltage limit devices coupled together at said junction between said first and second bulk capacitors; and a filter capacitor coupled across said first and second voltage limit devices for filtering said DC supply voltage.

16. The power supply of claim 15, wherein said first and second voltage limit devices each comprise Zener diodes.

17. The power supply of claim 14, wherein said oscillator circuit comprises:

a transistor having a control terminal and having a current path coupled to control current through said primary of said transformer;

a current limiter coupled between said current path of said transistor and primary ground;

a bias circuit having two ends with one end coupled to said DC source voltage and having a junction coupled to said control terminal of said transistor;

said transformer including a tertiary inductor coupled between the other end of said bias circuit and said current limiter; and a voltage limiter coupled between said control terminal of said transistor and primary ground.

18. The power supply of claim 17, wherein said current limiter comprises a resistor, wherein said bias circuit comprises a resistive voltage divider and wherein said voltage limiter comprises a Zener diode.

19. A method for providing an isolated low power output signal sourced from bleeder current from the DC input voltage developed across bulk capacitors of a switching power supply, comprising the steps of:

tapping bleeder current from the DC input voltage using at least one current limit resistor and at least one voltage limiter to provide a relatively low DC source voltage;

oscillating current sourced from the DC source voltage through a primary inductor of a low power transformer to transfer power to a secondary inductor; and regulating the voltage developed across the secondary inductor to provide the low power output signal.

20. The method of claim 19, wherein said tapping step comprises the step of:

coupling a voltage limiter in series with the current limit resistors for providing the DC source voltage.

\* \* \* \* \*